United States Patent
Samtani et al.

(10) Patent No.: US 10,129,429 B2
(45) Date of Patent: Nov. 13, 2018

(54) CONTENT SERIALIZATION BY VARYING CONTENT PROPERTIES, INCLUDING VARYING MASTER COPY WATERMARK PROPERTIES

(75) Inventors: Rajan Samtani, Agoura Hills, CA (US); Joel R. Meyer, Lake Oswego, OR (US); Ravi K. Sharma, Hillsboro, OR (US)

(73) Assignee: Digimarc Corporation, Beaverton, OR (US)

(*) Notice: Subject to any disclaimer, the term of this patent is extended or adjusted under 35 U.S.C. 154(b) by 2291 days.

(21) Appl. No.: 12/245,605

(22) Filed: Oct. 3, 2008

(65) Prior Publication Data

US 2009/0116686 A1    May 7, 2009

Related U.S. Application Data

(60) Provisional application No. 60/978,077, filed on Oct. 5, 2007.

(51) Int. Cl.
*H04N 1/32* (2006.01)
*G06F 21/10* (2013.01)
(Continued)

(52) U.S. Cl.
CPC ......... *H04N 1/32149* (2013.01); *G06F 21/10* (2013.01); *G06T 1/0028* (2013.01);
(Continued)

(58) Field of Classification Search
USPC .............................................. 705/51; 726/26
See application file for complete search history.

(56) References Cited

U.S. PATENT DOCUMENTS

| 5,748,763 A | 5/1998 | Rhoads |
| 5,768,426 A | 6/1998 | Rhoads |

(Continued)

FOREIGN PATENT DOCUMENTS

| EP | 1039414 | 9/2000 |
| JP | 2007201659 | 8/2007 |

(Continued)

OTHER PUBLICATIONS

Wagner, Fingerprinting, IEEE Proc. Symp. on Security and Privacy, Apr. 1983, pp. 18-22.

(Continued)

*Primary Examiner* — Tsan-Yu J Huang
(74) *Attorney, Agent, or Firm* — Digimarc Corporation

(57) ABSTRACT

This disclosure describes novel methods for generating unique copies of content. One method combines the functions of the master copy and unique copy watermarks. In particular, the method generates a unique copy by varying the manner in which the master copy watermark is embedded in unique copies of a content item. In one embodiment, the master copy watermark is repeated within the content item and its location is varied in a unique pattern that comprises the unique copy watermark. The unique copy is generated by producing a copy in which master copy watermarks are embedded in a unique pattern. For instance in one embodiment, the locations of the master copy watermarks in the content item are represented as a vector of delta values in which each delta value corresponds to the distance between a corresponding instance of the master copy watermark, and a neighboring instance of the master copy watermark. This vector is stored in a transaction record in association with transaction information, such as information identifying the master copy and information associated with the unique copy. Other ways of representing the unique (Continued)

pattern of attributes of the master copy watermark are also possible. In other embodiments, properties of the master copy watermark other than its location are varied through the content. The unique copy watermark is conveyed in the vector of deltas in these properties of the master copy watermark. Some examples of these properties of the master copy watermark signal include phase characteristics (e.g., the phase shift of a watermark carrier signal), frequency magnitude characteristics, etc. These properties are varied in a manner that does not alter the information carried in the master copy watermark. However, it does provide a variation that creates a unique copy, and the unique copy watermark is conveyed in this variation. The variation in location of the instances of the master copy watermark can be in different domains, such as a spatial domain, a time domain, a time-space domain, a transform domain (including frequency transform domains), a compressed domain, etc.

10 Claims, 5 Drawing Sheets

(51) Int. Cl.
*G06T 1/00* (2006.01)
*H04N 19/467* (2014.01)
*G11B 20/00* (2006.01)

(52) U.S. Cl.
CPC ....... *H04N 1/32299* (2013.01); *H04N 19/467* (2014.11); *G06T 2201/0051* (2013.01); *G06T 2201/0061* (2013.01); *G06T 2201/0064* (2013.01); *G11B 20/00086* (2013.01); *G11B 20/00869* (2013.01); *G11B 20/00884* (2013.01); *H04N 2201/327* (2013.01); *H04N 2201/3233* (2013.01)

(56) References Cited

U.S. PATENT DOCUMENTS

| | | | |
|---|---|---|---|
| 6,285,774 B1 | 9/2001 | Schumann et al. | |
| 6,330,335 B1 | 12/2001 | Rhoads | |
| 6,345,100 B1* | 2/2002 | Levine | 380/205 |
| 6,430,301 B1 | 8/2002 | Petrovic | |
| 6,912,315 B1 | 6/2005 | Wong et al. | |
| 6,915,481 B1 | 7/2005 | Tewfik et al. | |
| 7,269,734 B1 | 9/2007 | Johnson et al. | |
| 7,392,392 B2 | 6/2008 | Levy | |
| 7,392,394 B2 | 6/2008 | Levy | |
| 7,447,907 B2* | 11/2008 | Hart et al. | 713/176 |
| 7,724,919 B2 | 5/2010 | Rhoads | |
| 7,974,439 B2 | 7/2011 | Rhoads | |
| 8,014,563 B2 | 9/2011 | Rhoads | |
| 8,234,495 B2 | 7/2012 | Levy | |
| 2001/0025341 A1 | 9/2001 | Marshall | |
| 2001/0044899 A1* | 11/2001 | Levy | 713/176 |
| 2002/0095582 A1 | 7/2002 | Peled et al. | |
| 2002/0154144 A1* | 10/2002 | Lofgren et al. | 345/634 |
| 2002/0168082 A1 | 11/2002 | Razdan | |
| 2003/0105716 A1* | 6/2003 | Sutton et al. | 705/50 |
| 2005/0175179 A1 | 8/2005 | Kesal et al. | |
| 2006/0018507 A1* | 1/2006 | Rodriguez et al. | 382/100 |
| 2006/0062426 A1* | 3/2006 | Levy et al. | 382/100 |
| 2006/0075244 A1 | 4/2006 | Schumann et al. | |
| 2007/0038861 A1 | 2/2007 | Weber et al. | |
| 2007/0110237 A1 | 5/2007 | Tehranchi et al. | |
| 2007/0171480 A1 | 7/2007 | Matsunoshita | |
| 2007/0217651 A1 | 9/2007 | Ishii | |

FOREIGN PATENT DOCUMENTS

| | | |
|---|---|---|
| JP | 2007282200 | 10/2007 |
| WO | WO9741683 | 11/1997 |
| WO | WO0229510 | 4/2002 |
| WO | WO2004097828 | 11/2004 |
| WO | WO2007024994 | 3/2007 |

OTHER PUBLICATIONS

Brassil, Electronic Marking and Identification Techniques, Proc. of INFOCOM/94 Conf on Computer, IEEE Commun. Soc Conference, pp. 1278-1287.
PCT/US08/78847 International Search Report and Written Opinion dated Dec. 5, 2008.
Notice of Reasons for Rejection dated Feb. 8, 2012 in Application No. 2010-528190 in Japan.
Notification of the First Office Action dated Jan. 19, 2012 in Application No. 200880116526.9 in China.
European Search Report dated Mar. 22, 2011 in Application No. EP08835523.
European Examination Report dated Jun. 19, 2015 in Application No. EP08835523.5.
Notice of Reasons for Rejection dated Nov. 19, 2013 in JP Application No. 2010-528190.
Notice of Reasons for Rejection dated Feb. 5, 2013 in JP Application No. 2010-528190.
Examination Report dated May 17, 2018, in European Patent Application No. 08835523.5.

\* cited by examiner

CONTENT SERIALIZATION BY VARYING CONTENT PROPERTIES, INCLUDING VARYING MASTER COPY WATERMARK PROPERTIES

TECHNICAL FIELD

The invention relates to steganography, data hiding, content fingerprinting and content identification.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 5,862,260, 6,614,914, and 6,674,876, which are hereby incorporated by reference.

One application of digital watermarking is to uniquely serialize copies of a content item (e.g., song, music track, video program, movie, etc.). One way to serialize copies of the content item is to embed unique watermarks in each copy. In some cases, this is referred to as a transaction watermark (or transactional watermarking) because the watermark is associated with a transaction of the copy (e.g., a distribution of a copy which is serialized at the sender or receiver). The watermark itself may include unique transaction information or instead may be a code unique to the transaction and associated with transaction information in a database. In some cases, this is referred to as "forensic tracking" because the unique copy can be tracked or traced back to particular point in distribution (either a user that re-distributes, or the original distributor of the copy). For the sake of clarity, we refer to this form of watermarking to generate a unique copy as content serialization. We refer to the information associated with the unique copy as transaction information, which includes any information associated with the transaction of the copy. Depending on privacy considerations, the transaction information may or may not have information uniquely associated with a particular receiver or re-distributor of the unique copy, such as a user ID, account ID, device ID, domain ID, etc.

Since transaction information includes information specific to a transaction, it includes information that is not available prior to the transaction. This poses a technical challenge because this information cannot be associated with a unique copy until the transaction information is available. If the unique copy is generated after a request is made for the content item, the process of generating it and associating it with transaction information cannot substantially increase the latency of the transaction. Latency refers to the time between a request for a content item and its delivery to a requester. For example, in the case of a digital download of content from the Internet, the process of serializing a copy must not add substantial processing time or resource consumption after the user has requested a content item and before the user's copy is available for playback on the user's device.

To alleviate the processing required after the transaction request, certain aspects of the serializing process may be performed in advance. One approach is to create different copies of the content item in advance, divide each copy into the same content blocks, and then watermark the same blocks of content from the different copies with different data values (e.g., each block in one copy is marked with a data value of binary 1, while each block in a second copy is marked with a data value of binary zero). Then, at the time of the transaction, a content multiplexer selects blocks from the pre-embedded copies to create a new copy that is perceptually the same as the master and the pre-embedded copies, but has a unique sequence of data values embedded in it.

Another approach is to pre-compute information used in creating the unique copy prior to the transaction and then complete the process of generating the unique copy at the time of the transaction using this pre-computed information to reduce processing time. Examples include processing the content item (e.g., music track, song, TV program, movie) to identify watermark embedding locations, to calculate a perceptual mask used to control the amount of modification made at the embedding locations, and/or to compute modifications or substitute values that when applied to the content at the embedding locations produce a watermarked content item.

Another approach, which may be used in combination with the above pre-processing, is to create unique copies in advance of a request (e.g., by pre-embedding unique watermarks into distinct copies of the content item). At the time of the transaction, the content distributor provides the unique copy immediately to the requester, and then associates the unique watermark in that copy with the transaction in a transaction record database. As noted, depending on the application, this transaction record may include user information of the requester to associate the copy with the user through the unique watermark embedded in the copy. The unique watermark can be a watermark with a unique message payload (such as a serial number) or a unique pattern (such as a pseudo random pattern uniquely generated for each copy). This approach can be effective but has the drawback that extra storage is required to store uniquely serialized copies of the content item. Predictive analysis and load balancing can be used as described further below to generate serialized copies based on expected and actual popularity of a content item and then queue the copies for transmission in the edge servers of a content delivery network. While such prediction and load balancing can reduce the need to keep a large "inventory" of uniquely serialized copies, it still poses the problem that when a requester submits a request for a copy that is not in the inventory (e.g., not buffered, cached or queued for distribution), the process of generating the serialized copy must occur after the request, potentially adding to the latency of the response to the request.

An additional challenge associated with generating unique copies by altering the content item is that it may create a conflict with other information previously embedded in that content item. Digital watermarks are embedded in content for a variety of applications that do not require a unique watermark in each copy. Instead, a watermark or set of watermarks can be the same in each unique copy made from the master copy. These watermarks can be, and typically are, embedded in the master copy prior to generation of copies for distribution. For clarity, we will refer to a watermark that is the same for at least a set of unique copies of a content item to be the master copy watermark. These watermarks include watermarks that carry a content identifier (e.g., an identifier that identifies the master content item, but not individual copies of the master content item), copyright information and status, usage rights, device control flags or instructions, etc. All of this metadata associated with the master copy can be embedded in advance into the master copy from which copies are made for distribution. We will call unique watermarks embedded in the unique copies of the master copy as unique copy watermarks. The amount of metadata that needs to be embedded in either master or unique copy watermarks can be reduced by embedding an index to a metadata database that stores information about the master or unique copy. This enables the metadata to be updated over time.

The transaction information can only be associated with a unique copy after individual copies are made, even if these copies are made prior to a request. Stated another way, a copy can only be made unique (e.g., serialized) during or after that copy is generated, but not before. As such, any modification of the master copy to serialize an individual copy has the potential of altering the master copy in a manner that prevents proper reading of any previous watermark embedded in it. In addition, altering the copy may also prevent accurate identification of the master copy through the use of content fingerprinting, which identifies the master copy by its robust hash. In particular, alterations made to create unique copies that are perceptually similar may still alter the robust hash of the master copy, which has been registered in a content fingerprint database for use in identifying the master copy or its derivative copies.

One way to address this conflict is to use a process of generating unique copies that is compatible and does not conflict materially with the previous processing applied to the master copy. For example, at the time of creating the unique serialized copy, the generator of the unique copy (e.g., watermark embedder, content multiplexer, etc.) can detect a previous watermark and serialize the copy in a manner that does not conflict with the previous watermark by locating a new watermark at embedding locations that do not overlap the locations of a previously embedded watermark. These locations can be in time, space, frequency or some other domain, so long as they allow the watermarks to coexist and remain detectable by their respective detection processes.

This approach requires additional processing to detect the previous watermark, which is to be avoided if possible. To avoid this detection processing, the master copy can include metadata stored with the master copy (e.g., in a header) that specifies parameters of the previous watermark, such as its locations, perceptual mask, etc. The process of generating unique copies then uses this metadata to make alterations to create uniqueness in a manner that does not conflict with previous watermark embedding or fingerprint registration.

This disclosure describes novel methods for generating unique copies of content. One method combines the functions of the master copy and unique copy watermarks. In particular, the method generates a unique copy by varying the manner in which the master copy watermark is embedded in unique copies of a content item. In one embodiment, the master copy watermark is repeated within the content item and its location is varied in a unique pattern that comprises the unique copy watermark. The unique copy is generated by producing a copy in which master copy watermarks are embedded in a unique pattern. For instance in one embodiment, the locations of the master copy watermarks in the content item are represented as a vector of delta values in which each delta value corresponds to the distance between a corresponding instance of the master copy watermark, and a neighboring instance of the master copy watermark. This vector is stored in a transaction record in association with transaction information, such as information identifying the master copy and information associated with the unique copy. Other ways of representing the unique pattern of attributes of the master copy watermark are also possible.

In other embodiments, properties of the master copy watermark other than its location are varied through the content. The unique copy watermark is conveyed in the vector of deltas in these properties of the master copy watermark. Some examples of these properties of the master copy watermark signal include phase characteristics (e.g., the phase shift of a watermark carrier signal), frequency magnitude characteristics, etc. These properties are varied in a manner that does not alter the information carried in the master copy watermark. However, this method does provide an imperceptible variation of the content that creates a unique copy, and the unique copy watermark is conveyed in this variation. The variation in location of the instances of the master copy watermark can be in different domains, such as a spatial domain, a time domain, a time-space domain, a transform domain (including frequency transform domains), a compressed domain, etc.

To optimize performance of a content distribution system, the unique copies can be generated using one or more combinations of the pre-processing techniques described above, including pre-embedding or pre-processing the master copy of the content item.

Further features will become apparent with reference to the following detailed description and accompanying drawings.

DETAILED DESCRIPTION

Figure 1:
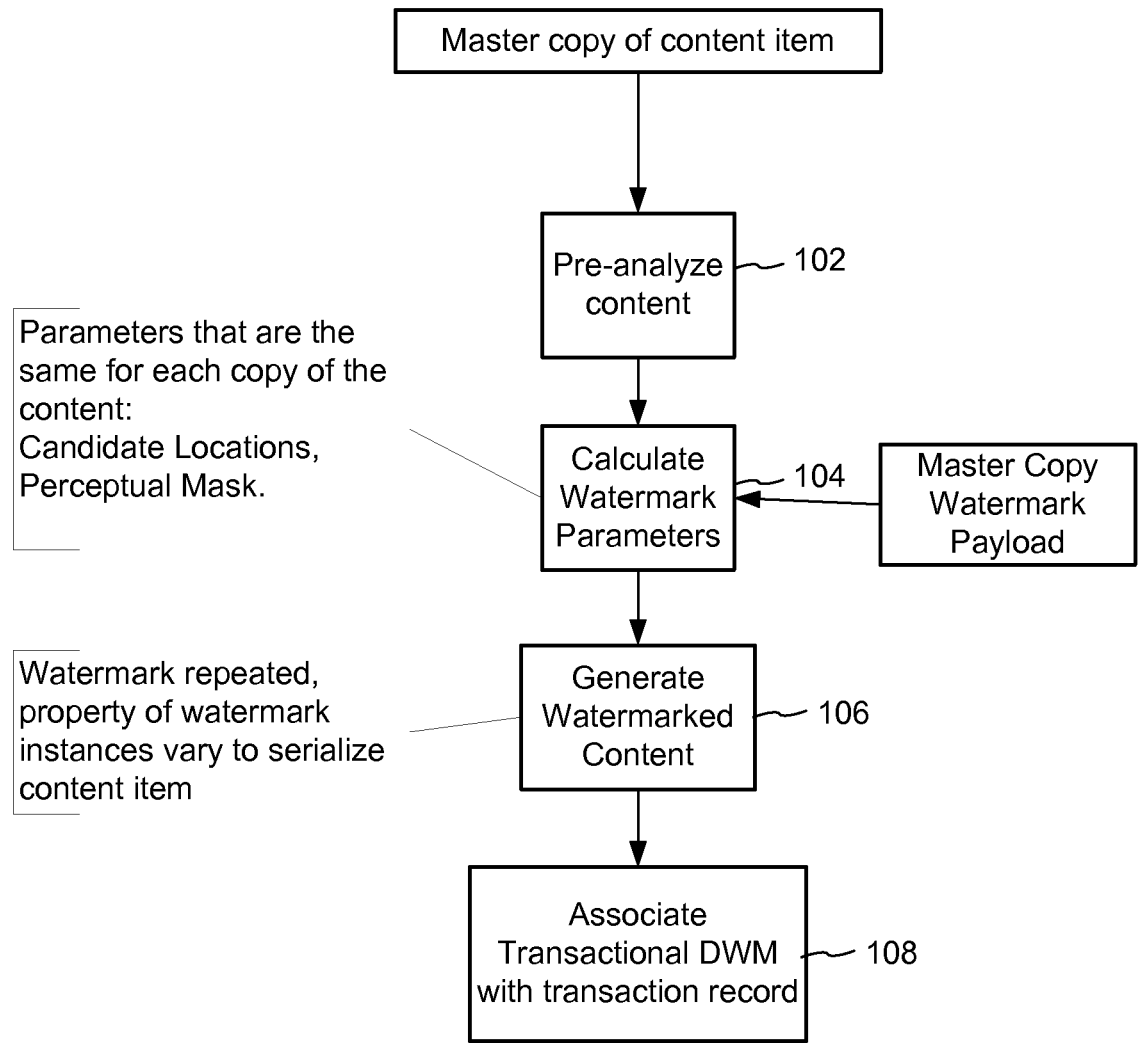
FIG. 1 is a flow diagram illustrating a process for generating a unique copy of a content item by varying the properties of the master copy.

FIG. 1 is a flow diagram illustrating a process for generating a unique copy of a content item by varying the properties of the master copy. The process begins with master copy of a content item, such as a song or video program. In step 102, the process analyzes the content master copy to provide information about the content used for embedding a master copy watermark. This includes information used to divide the content into blocks, information for identifying embedding locations, and/or information for creating a perceptual mask. In step 104, the process takes the desired data string comprising the watermark payload and calculates the watermark parameters for embedding this watermark payload into each of the content blocks at the embedding locations. These parameters may include a perceptual mask for each block, specific embedding locations, and change or substitute values needed to embed the payload in the blocks at the embedding locations. In the case of a compressed content item, it is preferable to have blocks of the content item pre-embedded and compressed prior to a transaction so that the unique copy can be generated quickly through block selection and/or substitution with little alteration of the content blocks from which the unique copy is generated.

Steps 102 and 104 can be performed in advance of a transaction request to reduce processing time required to generate a unique copy of the content item from the master copy.

In step 106, a unique copy generator selectively applies the master copy watermark to corresponding blocks to generate a unique copy. The unique copy watermark is conveyed in a pattern of properties of the instances of the master copy watermark. In step 108, the unique copy watermark (e.g., a transactional watermark) is associated with transaction information for a transaction.

Step 106 may be performed before or after a transaction request. For example, before a request is made, a predicted number of unique copies of the master copy are generated by this process and distributed to the queues in the edge servers of a content delivery network. The queues are replenished with unique copies in a similar manner. If a queue is empty, step 106 is executed to generate another unique copy in real time.

Figure 2:
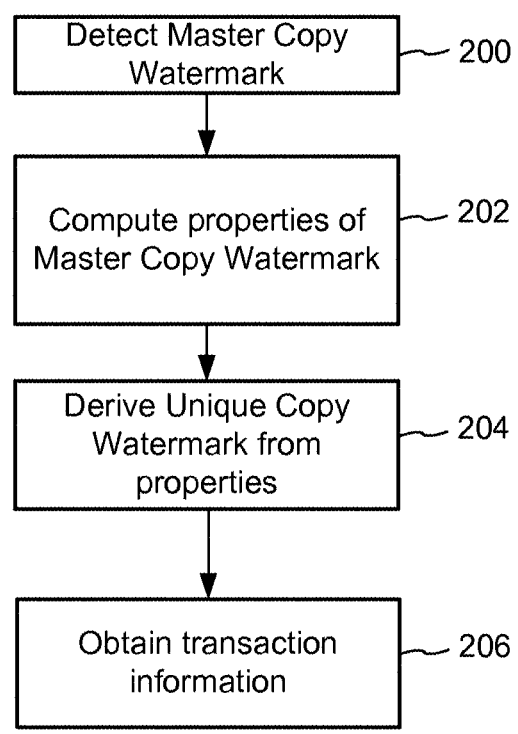
FIG. 2 is a flow diagram illustrating a process for detecting a master copy watermark and unique copy watermark conveyed in the variations of the master copy watermark.

FIG. 2 is a flow diagram illustrating a process for detecting a master copy watermark and unique copy watermark conveyed in the variations of the master copy watermark. The process begins in step 200 with a process of detecting the master copy watermark. The reader is referred to U.S. Pat. Nos. 5,862,260, 6,614,914, and 6,674,876 and other digital watermark literature in the field for instruction on how to detect instances of a watermark in blocks of content. Typically, this process entails first detecting synchronization information to ascertain location of the instances of the master copy watermark in the content and then extracting the message payload from the instances. In some cases, blocks of the content can be accumulated to increase the signal to noise ratio of the watermark to aid in detecting the watermark and extracting the message payload. Once at least one master copy watermark is detected, the detector can further refine the data and identify the other instances of the master copy watermark. As a result of this step, the detector has identified instances of the master copy watermark in the content item.

In step 202, the detector computes a property of each instance of the master copy watermark. In one embodiment, this property is the relative location of the instances of the master copy watermark. The location information is represented as a vector of distances or positions of the watermarks. In other embodiments, the property is the relative position of the payload to a synchronization component in the master copy watermark, the distances between instances of watermarks, the distance of a watermark relative to a content marker (such as edge or peak in the signal), or the frequency of a watermark signal within a given period of time, space or other domain. Other properties, such as the phase or frequency characteristics of the master copy watermark may be used as well.

In step 204, the detector derives a vector representing the properties computed in the previous step. This vector comprises a sequence of data values corresponding to the unique copy watermark. Error correction code processing may be used to derive unique serial number from the vector. This vector or serial number is then used in step 206 to look up transaction information in a metadata database to get the transaction information associated with this particular unique copy of the content item. The metadata may include links to other databases from which additional information about the master copy may be obtained. Similarly, a content identifier carried in the payload of the master copy watermark may be used to fetch additional information in a separate metadata database indexed by content identifier.

Figure 3:
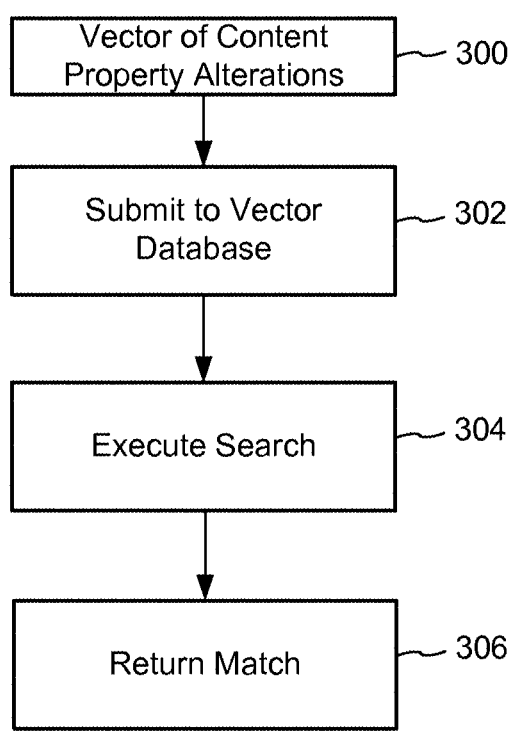
FIG. 3 is a flow diagram illustrating a process of searching a database to find a matching vector of content alterations.

In some embodiments, alterations are made at each instance of the master copy watermark. These alterations form a vector of alterations. However, due to distortion of the content signal, the alterations detected by the detector may not exactly match the alterations originally made. In this case, a fuzzy matching process is used to ascertain which copy this signal represents. As shown in FIG. 3, the process begins in step 300 with the input of a vector of content property alterations derived from the received signal. In step 302, this vector is submitted to a vector database in which the vector of alterations for each copy have been stored previously. This database and associated search can utilize robust fingerprint and content hashing schemes currently in use for content identification. In step 304, a search is executed to find the closest matching vector. The closest matching vector is returned in step 306 along with a unique serial number associated with the copy. This serial number indexes a database with the transaction information for the copy.

Figure 4:
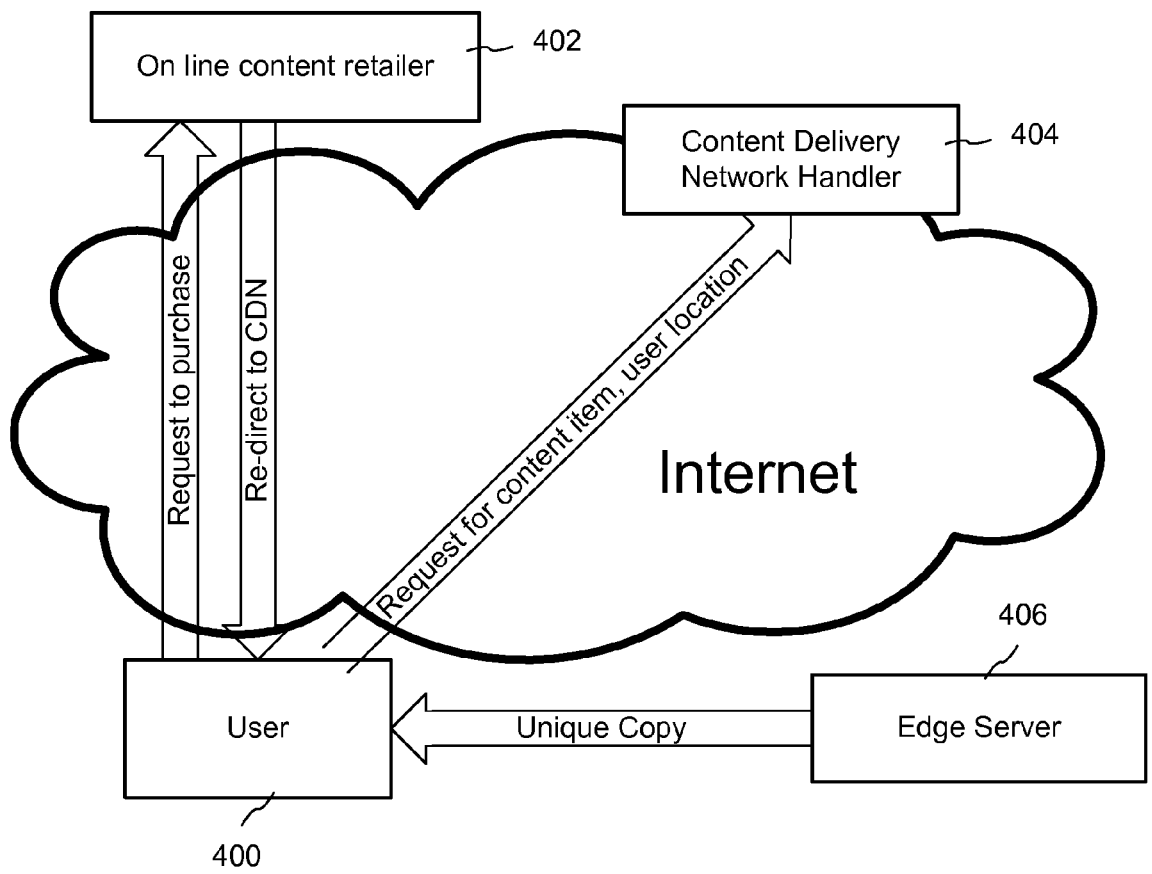
FIG. 4 illustrates an embodiment of network content delivery of a serialized copy of a content item, such as a song or video program.

FIG. 4 illustrates an embodiment of network content delivery of a serialized copy of a content item, such as a song or video program. One application scenario for the methods describe above is for robust content serialization for digitally distributed content. FIG. 4 helps to illustrate where the method would be implemented in a content delivery network used for digital distribution of music and video programs, such as iTunes and other file download and streaming content delivery services. This example is not intended to limit the application of the methods described above. Indeed, the methods could be employed in other content delivery systems including satellite and cable on demand delivery services, for example. In addition, the methods can be applied at the distributor (e.g., server) or receiver (client computer, set top box, mobile device, etc.).

In the example illustrated in FIG. 4, a user device 400 begins by sending a request to purchase a content item at a content retailer's web portal. This request is received at a server 402 of the content retailer. After verifying payment, the content retailer returns a URL to the user device, redirecting the user device to a content delivery network (CDN). The user device issues a request to a CDN handler 404, which in turn, selects an edge server 406 to process this request based on the selected content item, availability of a pre-processed unique copy of the content item and location relative to the user device. Prior to the request, the CDN distributes unique copies of the master copy to the edge servers based on predicted and actual demand. Individual requests for copies of the content item are handled based on a load balancing scheme in which requests for a content item are distributed over edge servers where the content item has been queued up for delivery. The edge server provides the next unique copy of the requested content item to the user device. At this point, the association between the unique copy watermark and the transaction information is made and stored in the transaction record database. As noted, if a unique copy has not been generated previously, it is generated at this time using the methods described above to minimize the latency in responding to the request.

Figure 5:
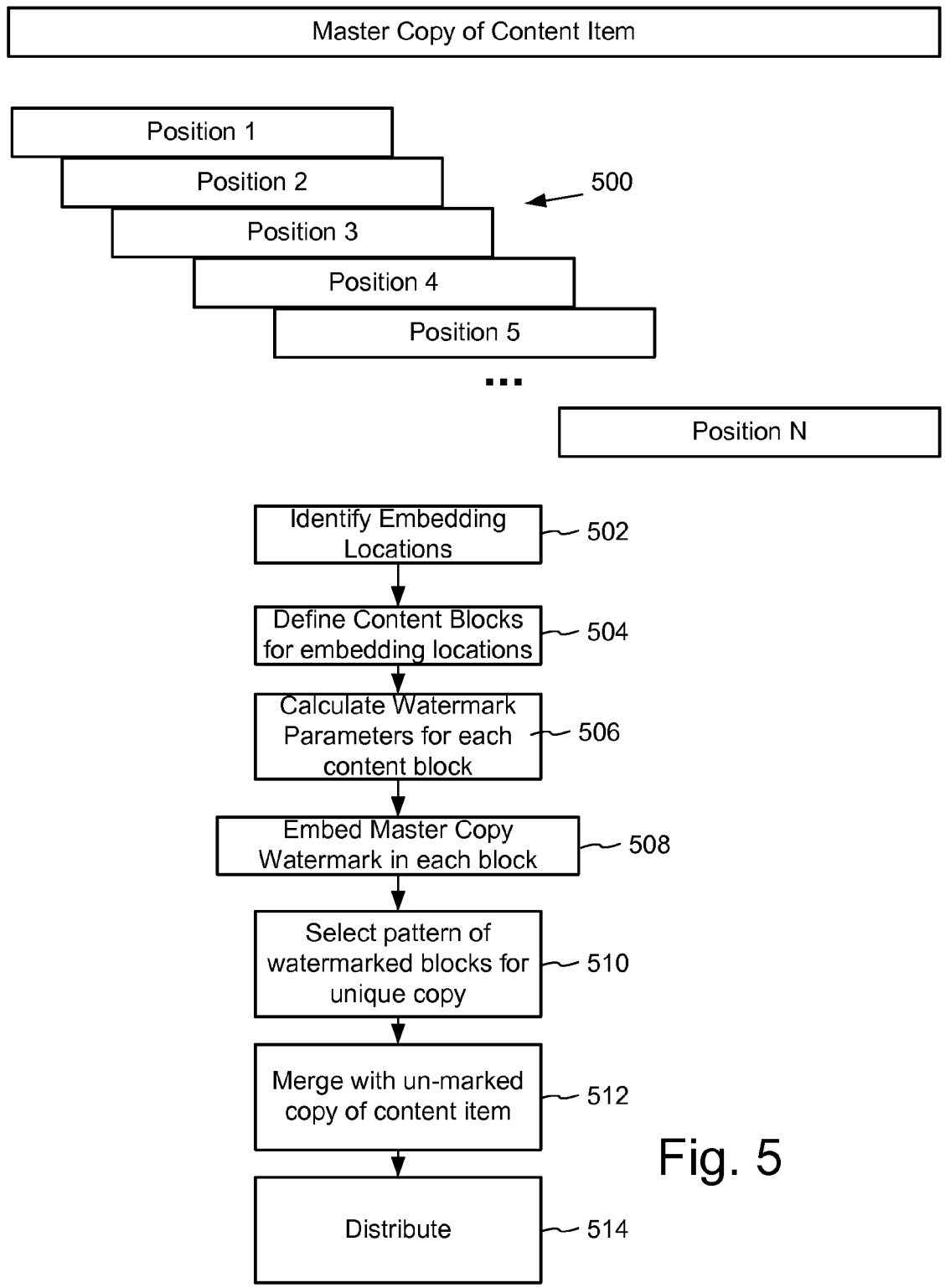
FIG. 5 is a diagram illustrating an embodiment for generating a unique copy from a master copy of a content item.

FIG. 5 is a diagram illustrating an embodiment for generating a unique copy from a master copy of a content item. FIG. 5 shows a more specific example in which the property of the master copy watermark that conveys the unique copy watermark is the position of the instances of the master copy watermark in the unique copy. As shown, the master copy is divided into overlapping blocks 500 corresponding to candidate locations of the master copy watermark.

In step 502, the method identifies these embedding locations, and in step 504, it defines the content blocks that correspond to these embedding locations. In step 506, it then proceeds to calculate the watermark parameters for each block as described in connection with FIG. 1. In step 508, it embeds the master copy watermark into each block. Steps 502-508 are preferably performed in advance of a request for a unique copy. The output of these steps can be distributed within the CDN to enable generation of unique copies of a content item within the CDN. In one implementation, the output of step 508 is provided to the process that replenishes the queue of copies within the CDN, such as at the edge server for the content item.

In steps 510 and 512, a unique copy is generated by selecting a subset of the pre-watermarked blocks and merging the selected subset with the original un-watermarked content of the content item. This creates a copy with a pseudorandom selection of embedding positions of the master copy watermark. For example, of the positions shown in FIG. 5 at item 500, a pseudorandom selection of these positions is made to correspond to the unique serial number associated with the resulting copy formed by this process. In step 514, this unique copy is distributed and the unique serial number is stored in transaction record along with transaction information for this request.

In one implementation, instances of the master copy watermark are repeatedly tiled throughout the content (e.g., over time, frequency, space or some combination of these domains). This redundant embedding is exploited in watermark decoding by accumulating instances of the master copy watermark for increased robustness. A unique copy is created by removing or suppressing selected components of the master copy watermark in certain locations (e.g., spatial, temporal or frequency locations, etc). These components and their locations are determined by the message to be carried by the unique copy watermark. Removing components should be computationally less expensive than adding (or embedding) components. A rough analogy is frequency components comprising a synchronization signal. Say there are 128 such frequency components. Assume that only a subset of these 128 is required to recover synchronization. In any given unique copy 64 of these could be suppressed to convey the transactional mark. Alternatively, each block of the unique copy could have some combination of the 64 frequency components suppressed. The relative encoding from block to block would then convey the transactional watermark.

One example of the above approach is delivery of a compressed content program (e.g., song, show, movie, clip) from a content delivery network. For example, a pre-watermarked (watermarked with several instances of a master copy watermark), compressed content signal sits queued in an edge server of a content delivery network. When a transaction request is made, a selected component of the master copy watermark is removed from selected instances of the master copy watermark during a final encoding process. The edge server then sends the modified content signal.

Depending on the bandwidth between the sender and the receiver (e.g., a server and client), and the size of the content signal, another distribution strategy is to distribute (or stream) the content signal in such a manner that initial parts of the content do not contain the unique copy watermark. As the content is buffered up at the client, the latency between media output and the buffered data allows the unique copy watermark to be inserted into the latter part of the content without adding to the latency of the transmission.

Another distribution strategy is where the receiver shares the burden of introducing the unique copy watermark. This strategy optionally includes protecting the content signal through other mechanisms (e.g., encryption) before it reaches a secure part of the receiver. The insertion of the unique copy watermark (e.g., by modification of the master copy watermark or otherwise) then occurs at this secure part before the content is readied for consumption by the user.

The above methods may be employed in a variety of content delivery methods, including file download, streaming delivery (such as short form video), one to one transfer, or one to many broadcast. One particular application is in a viral distribution model where the business model calls for compensating the sender of content in the viral distribution path. In this model, the sender ID can be identified with the unique copy watermark associated with the sender.

Certain types of distribution on networks utilize an approach in which portions of a content signal requested by receiver are obtained from several different senders. BitTorrent is such a protocol for transferring files. The techniques described above can be used to identify content and copies transferred using such protocols. The master copy watermark is repeated redundantly in the portions, and thus, enables the content to be identified from watermark decoding from individual portions. Similarly, the unique copy watermark is recoverable from individual portions that include a sufficient number of master copy watermarks to enable decoding of the unique copy watermark. Another approach is to make unique copy watermark modifications of the master copy watermark at the receiver to associate the copy assembled at the receiver with the receiver. Then, when the receiver re-distributes its copy, the receiver becomes a sender and the sender's copy has a unique copy watermark associated with the sender. Each time a copy is re-distributed, the unique copy watermark may be detected and logged as participating in the redistribution of the copy.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. Provisional Patent Application No. 60/978,077, filed Oct. 5, 2007, is also hereby incorporated herein by reference.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of serializing a content item comprising:
analyzing a master copy of the content item stored in an electronic memory to determine parameters for embedding a master copy watermark in the content item, the master copy watermark conveying digital information within the content item that is common for copies of the content item; and
from a master copy of the content item stored in an electronic memory, generating a unique copy of the content item by altering the master copy watermark, the alterations forming a pattern that comprises a unique copy watermark, wherein the alterations comprise variations in embedding the master copy watermark; and storing the unique copy in an electronic memory, the unique copy including the master copy watermark and the pattern comprising the unique copy watermark.

2. The method of claim 1 wherein the alterations comprise variations in a property of the master copy watermark that is embedded at locations in the content item.

3. The method of claim 2 wherein the locations comprise frequency locations.

4. The method of claim 2 wherein the locations comprise temporal locations.

5. The method of claim 2 wherein the variations comprise removal of a component of the master copy watermark.

6. A non-transitory computer readable medium on which is stored instructions, which, when executed by a computer, perform a method of serializing a content item comprising:
analyzing a master copy of the content item to determine parameters for embedding a master copy watermark, the master copy watermark conveying digital information that is common for copies of the content item; and
generating a unique copy of the content item from a master copy by altering the master copy watermark, the alterations forming a pattern that comprises a unique copy watermark, wherein the alterations comprise variations in embedding the master copy watermark.

7. The computer readable medium of claim 6 wherein the alterations comprise variations in a property of the master copy watermark that is embedded at locations determined through analysis of the master copy of the content item.

8. The computer readable medium of claim 7 wherein the locations comprise frequency locations.

9. The computer readable medium of claim 7 wherein the locations comprise temporal locations.

10. The computer readable medium of claim 7 wherein the variations comprise removal of a component of the master copy watermark.

* * * * *